(12) United States Patent
McKee

(10) Patent No.: US 10,427,891 B2
(45) Date of Patent: Oct. 1, 2019

(54) TRANSFER GUARD SYSTEM AND MOUNT THEREOF

(71) Applicant: Flexible Steel Lacing Company, Downers Grove, IL (US)

(72) Inventor: James P. McKee, Ada, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 16/019,843

(22) Filed: Jun. 27, 2018

(65) Prior Publication Data

US 2019/0002209 A1 Jan. 3, 2019

Related U.S. Application Data

(60) Provisional application No. 62/526,641, filed on Jun. 29, 2017.

(51) Int. Cl.
*B65G 47/66* (2006.01)
(52) U.S. Cl.
CPC .... *B65G 47/66* (2013.01); *B65G 2812/02128* (2013.01); *B65G 2812/08* (2013.01)
(58) Field of Classification Search
CPC ........ B65G 47/66; B65G 21/10; B65G 21/20; B65G 21/2009; B65G 21/2027; B65G 21/2045; B65G 21/22
(Continued)

(56) References Cited

U.S. PATENT DOCUMENTS

| 2,232,081 A | 2/1941 | Sloane |
| 2,237,345 A | 4/1941 | Frentzel, Jr. et al. |

(Continued)

FOREIGN PATENT DOCUMENTS

| DE | 3014608 | 10/1981 |
| DE | 3224557 | 1/1984 |

(Continued)

OTHER PUBLICATIONS

Notification of Transmittal of the International Search Report and the Written Opinion of the International Searching Authority, or the Declaration from the International Bureau of WIPO for corresponding International Application No. PCT/US18/39995, dated Sep. 24, 2018, 14 pages.

*Primary Examiner* — William R Harp
(74) *Attorney, Agent, or Firm* — Fitch, Even, Tabin & Flannery LLP

(57) ABSTRACT

In one aspect, a transfer guard system is provided for transferring objects across a gap between conveying surfaces of a conveyor. The transfer guard system includes an elongate mounting member and at least one transfer guard member connected to the mounting member. The transfer guard system includes at least one mount having a receiver that receives the mounting member. The at least one mount includes a plurality of link members and at least one pivot connection between the link members. The at least one pivot connection permits the mounting member receiver to be pivoted along an arcuate path within the gap to position the receiver at a predetermined position in the gap. The at least one mount further includes at least one locking member operable to fix the link members relative to one another and secure the mounting member receiver at the predetermined position in the gap.

27 Claims, 12 Drawing Sheets

(58) Field of Classification Search
USPC .............................................. 198/600, 860.3
See application file for complete search history.

(56) References Cited

U.S. PATENT DOCUMENTS

| | | | |
|---|---|---|---|
| 2,268,724 A | 1/1942 | Shackelford | |
| 2,517,983 A | 8/1950 | Crosland | |
| 2,536,961 A | 1/1951 | Smith | |
| 2,624,444 A | 1/1953 | Casabona | |
| 2,627,960 A | 2/1953 | Eberle | |
| 2,862,599 A * | 12/1958 | Sinden | B66B 29/06 |
| | | | 198/323 |
| 2,899,086 A | 8/1959 | Saint-Andre | |
| D209,071 S | 10/1967 | Koch | |
| 3,345,957 A | 10/1967 | Welch | |
| D209,421 S | 11/1967 | Fabian | |
| 3,465,489 A | 9/1969 | Monaghan | |
| 3,548,996 A | 12/1970 | Ellis | |
| 3,587,674 A | 6/1971 | Adkin | |
| 3,623,598 A | 11/1971 | Anfossi | |
| 3,738,650 A | 6/1973 | Ossenkop et al. | |
| 3,878,735 A | 4/1975 | Preuss | |
| 3,988,880 A | 11/1976 | Miyazaki et al. | |
| 4,096,943 A | 6/1978 | Gentsch | |
| 4,132,304 A | 1/1979 | Gent | |
| 4,288,208 A | 9/1981 | Kusters | |
| 4,613,036 A | 9/1986 | Bourgeois | |
| 4,718,543 A | 1/1988 | Leisner et al. | |
| D303,974 S | 10/1989 | Karr | |
| 4,989,723 A | 2/1991 | Bode et al. | |
| 5,009,307 A | 4/1991 | Chance et al. | |
| 5,044,485 A | 9/1991 | Loder | |
| 5,065,222 A | 11/1991 | Ishii | |
| 5,215,182 A | 6/1993 | Garbagnati | |
| 5,311,982 A | 5/1994 | Clopton | |
| 5,320,478 A | 6/1994 | Gonsowski et al. | |
| 5,344,001 A | 9/1994 | Kawaai et al. | |
| 5,584,373 A | 12/1996 | Layne | |
| 5,597,062 A | 1/1997 | Biwer | |
| 5,597,063 A | 1/1997 | Bogle et al. | |
| 5,695,042 A | 12/1997 | van der Burgt | |
| D407,174 S | 3/1999 | Baker | |
| 5,957,265 A | 9/1999 | Clopton | |
| 5,971,129 A | 10/1999 | Stawniak et al. | |
| D419,742 S | 1/2000 | Abbestam | |
| 6,138,819 A | 10/2000 | Bogle et al. | |
| 6,164,435 A | 12/2000 | Coen et al. | |
| 6,550,604 B2 | 4/2003 | MacLachlan | |
| 6,589,631 B1 | 7/2003 | Suzuki | |
| 6,630,633 B1 | 10/2003 | Uber et al. | |
| D483,168 S | 12/2003 | McDaniel | |
| D484,545 S | 12/2003 | McIlvaine | |
| D493,933 S | 8/2004 | Schwagermann | |
| 6,896,122 B2 | 5/2005 | Gambrell et al. | |
| 6,959,803 B1 | 11/2005 | Layne et al. | |
| 7,210,569 B1 | 5/2007 | Tarhan et al. | |
| D547,523 S | 7/2007 | Swinderman | |
| 7,258,225 B2 | 8/2007 | Hall | |
| 7,413,088 B2 * | 8/2008 | Temler | B07B 13/04 |
| | | | 209/521 |
| 7,523,820 B1 | 4/2009 | Wu et al. | |
| 8,042,682 B2 | 10/2011 | Ertel | |
| 8,162,133 B2 | 4/2012 | Ruge | |
| 8,210,341 B2 | 7/2012 | Marshall et al. | |
| 8,365,899 B2 | 2/2013 | Mckee | |
| 8,567,591 B2 * | 10/2013 | Gonzalez Alemany | |
| | | | B66B 23/00 |
| | | | 198/600 |
| 9,022,207 B2 | 5/2015 | Tully et al. | |
| 9,027,738 B2 * | 5/2015 | Coen | B65G 37/00 |
| | | | 198/539 |
| 9,452,896 B2 * | 9/2016 | Lee | B65G 47/66 |
| D780,399 S | 2/2017 | Pettinga | |
| 9,663,306 B2 | 5/2017 | Pettinga | |
| 2005/0173858 A1 | 8/2005 | Temler et al. | |
| 2006/0070966 A1 | 4/2006 | Koudys et al. | |
| 2006/0108204 A1 | 5/2006 | Marsetti | |
| 2007/0023257 A1 | 2/2007 | Schiesser | |
| 2008/0296129 A1 | 12/2008 | Yagi et al. | |
| 2010/0108467 A1 | 5/2010 | Barreyre et al. | |
| 2010/0230247 A1 | 9/2010 | Mckee | |
| 2011/0132725 A1 | 6/2011 | Marshall et al. | |
| 2014/0183002 A1 | 7/2014 | Tully | |
| 2015/0291368 A1 | 10/2015 | Pettinga | |
| 2017/0055749 A1 | 3/2017 | Bing | |
| 2018/0265309 A1 * | 9/2018 | Yasinski | B65G 47/841 |

FOREIGN PATENT DOCUMENTS

| | | |
|---|---|---|
| DE | 8700878 | 3/1987 |
| DE | 19858521 | 6/2000 |
| DE | 202006003116 | 4/2006 |
| EP | 0156113 | 10/1985 |
| EP | 0778229 | 6/1997 |
| EP | 0906879 | 4/1999 |
| EP | 0919493 | 6/1999 |
| GB | 842230 | 7/1960 |
| GB | 1116571 | 6/1968 |
| GB | 1352993 | 5/1974 |
| JP | H115264 | 1/1999 |
| JP | H11199038 | 7/1999 |
| JP | 2000177836 | 6/2000 |
| NL | 2002344 | 6/2010 |
| SU | 590213 | 1/1978 |
| SU | 1159859 | 6/1985 |
| SU | 1328266 | 8/1987 |
| WO | 2011071743 | 6/2011 |

* cited by examiner

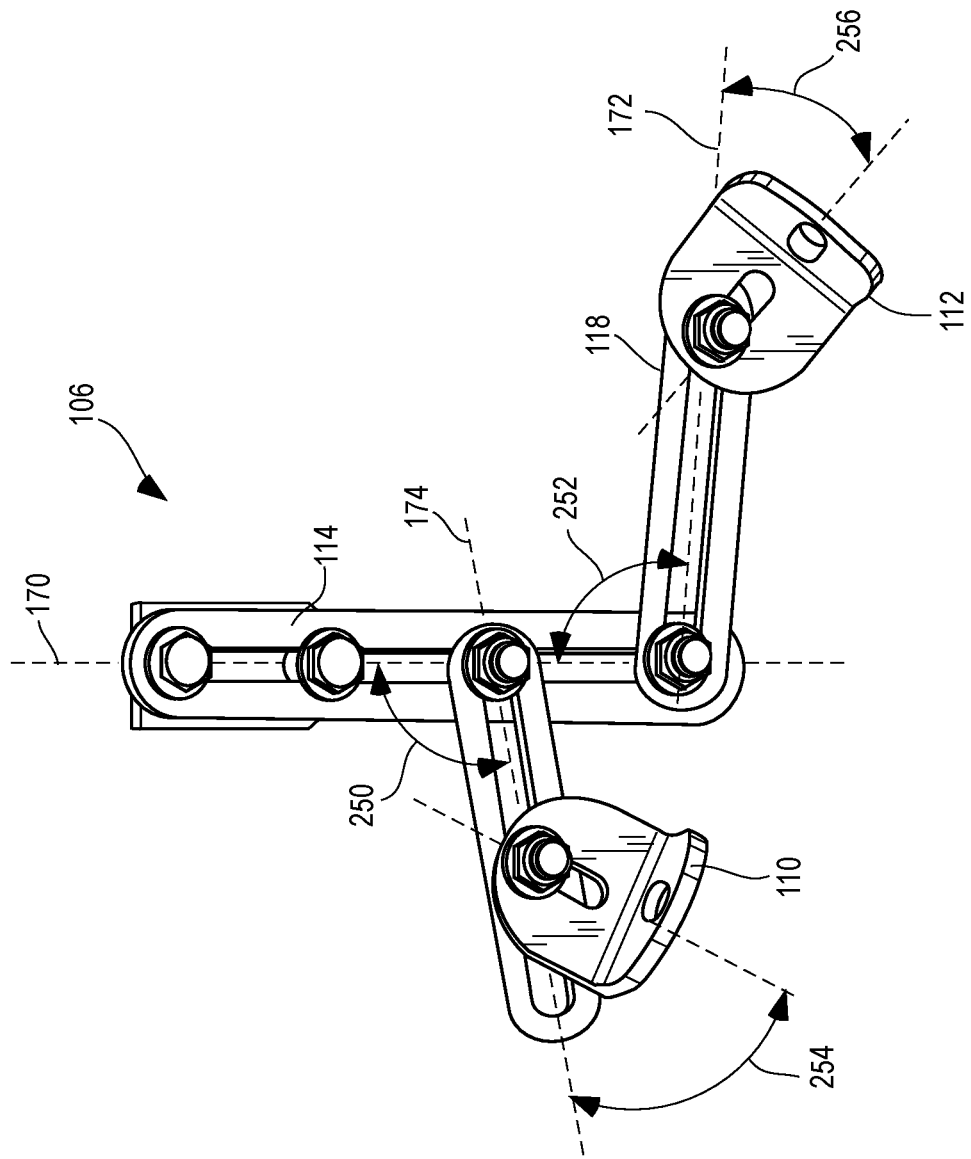

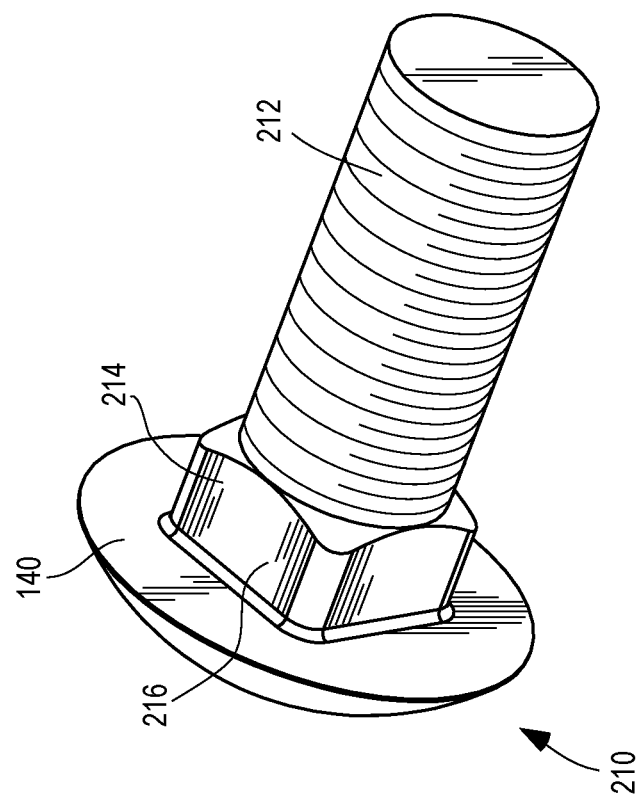

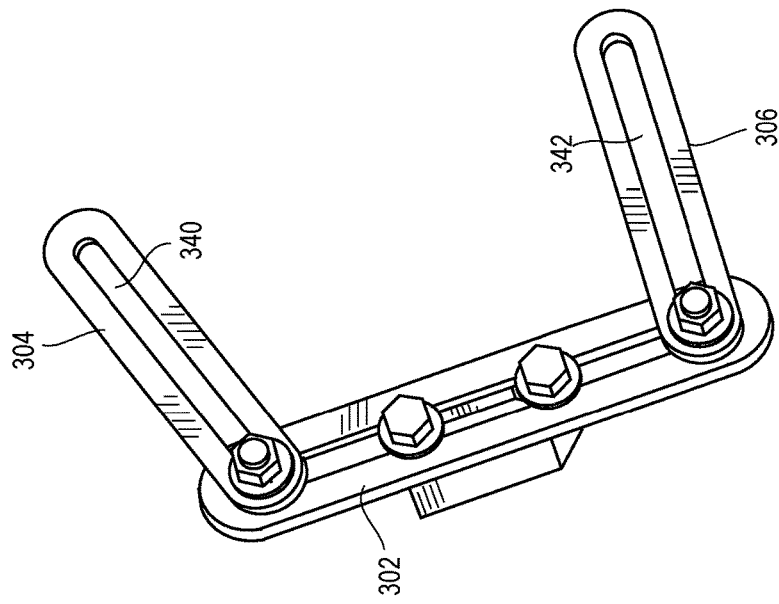
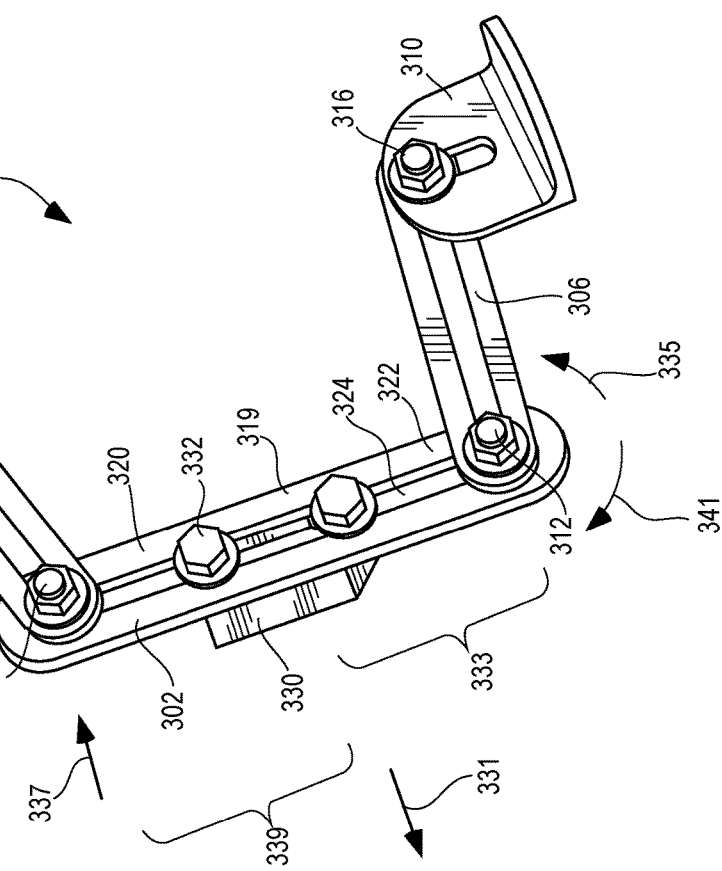

TRANSFER GUARD SYSTEM AND MOUNT THEREOF

CROSS-REFERENCE TO RELATED APPLICATIONS

This application claims the benefit of U.S. Provisional Patent Application No. 62/526,641, filed Jun. 29, 2017, which is hereby incorporated by reference in its entirety.

FIELD

This disclosure relates to an apparatus for transferring objects across a gap in a conveyor.

BACKGROUND

Conveyors are used to convey objects from one position to another and may include subsystems, such as conveyor belts, chutes, and rollers. There may be gaps between conveying surfaces of a conveyor such as at hitch in a conveyor belt where the conveyor belt changes direction. Another example of a gap between conveying surfaces of a conveyor is between a first conveyor belt of the conveyor and a second conveyor belt or a chute of the conveyor. Different transfer guard systems may be installed to transfer objects across the gap and resist objects from falling through the gap. Transfer guard systems are known to reduce product jams which may result in belt or other system damage.

One known transfer guard system includes a single sheet of ultra-high molecular weight (UHMW) polyethylene material that is rigidly attached to a bar support. The sheet of UHMW polyethylene material transfers objects across a gap and the bar support is welded or fastened to conveyor structure near the gap.

Some conveyors include a pair of conveying surfaces, such as a pair of conveyor belts, separated by a gap and side panels or skirts extending along opposite sides of the conveyor belts and the gap. Because the skirts extend along the gap, an installer may mount a transfer guard system to the skirts. The skirts thereby provide a readily accessible location to secure the transfer guard system.

Other conveyors include modular conveyor components such as a series of conveyor belt systems that are positioned one after another to transfer objects along a predetermined path. Transfer guard systems are used to transfer objects across gaps between the modular conveyor components and limit loss of product or jams at these gaps. One advantage of modular conveyor components is that they may be readily repositioned to reconfigure the path of the conveyor. Although the modular conveyor components may be readily repositioned, a transfer guard system for transferring objects across the gap between the components will have to be removed and re-installed between the components in their new positions. The ability of these modular conveyor components to be readily rearranged may render unsuitable some transfer guard systems that are welded to conveyor structure near the gap.

Modular conveyor components also present the difficulty of reduced conveyor structure near the gap between the components for an installer to use for mounting a transfer guard system. For example, the conveyor may not have skirts extending along opposite sides of the gap between the modular conveyor components. There may be little, if any, suitable structure extending between the modular conveyor components to which a transfer guard system can be mounted.

Another difficulty is that each gap between the modular conveyor components may have a different geometry so that the mounting of a transfer guard system to transfer objects across each gap may involve a custom, one-off installation. One prior approach to mounting a transfer guard system to a pair of modular conveyor components involves securing channel members to extend along opposite sides of the gap. An installer positions opposite ends of a mounting bar in the channels so that the mounting bar extends laterally across the gap, and the installer then connects transfer guard members to the mounting bar. One issue with this approach is the position, orientation, and length of the channels may need to be customized for each gap of the conveyor.

SUMMARY

In accordance with one aspect of the present disclosure, a transfer guard system is provided that includes an elongated mounting member for extending laterally across a gap between conveying surface portions. The transfer guard system includes at least one transfer guard member configured to be connected to the mounting member to transfer objects across the gap in a downstream longitudinal direction. The transfer guard system also has a pair of adjustable mounts configured to connect the mounting member to conveyor structure. The adjustable mounts have an installation configuration that permits adjustment of an operating position of the mounting member to a plurality of different operating positions. The adjustable mounts also have an operating configuration that secures the mounting member in the selected position. Each of the adjustable mounts includes support members configured to be movable between a plurality of angular orientations relative to each other and a plurality of positions relative to each other with the adjustable mount in the installation configuration. Further, the support members are configured to be fixed relative to each other with the adjustable mount in the operating configuration. The ability of the support members to move to different angular orientations and positions relative to each other provides significant flexibility in positioning the at least one transfer guard member to convey objects across a gap between conveying surface portions. Further, the adjustable mounts provide flexibility in installing the transfer guard system which reduces conveyor downtime.

The present disclosure also provides a conveyor system including a pair of conveying surface portions for conveying objects in a downstream longitudinal direction and a gap extending laterally between the conveying surface portions. The conveyor system includes at least one transfer member having a surface configured to transfer objects across the gap and a mounting member extending laterally for supporting the at least one transfer member. The conveyor system further includes a pair of adjustable mounts connecting the mounting member to conveyor structure. Each adjustable mount includes a plurality of links for supporting the mounting member and at least one connector assembly configured to connect the links. The at least one connector assembly has an unlocked configuration that permits the links to pivot relative to each other and a locked configuration that fixes the links relative to each other. Because the links can pivot relative to each other, one or more links of each mount can be pivoted throughout a range of movement to a position where the link can be connected to the conveyor structure.

In accordance with another aspect of the present disclosure, a method is provided of installing a transfer guard system for transferring objects across a gap between conveying surface portions. The transfer guard system includes a pair of mounts on either side of the conveying surface portions. The method includes adjusting the relative position of links of linkages of the mounts of the transfer guard system. The method further includes fixing the linkages of the mounts to support a transfer guard mounting member of the transfer guard system at a desired position relative to the gap. The linkages of the mounts thereby permit adjustment to the operating position of the transfer guard mounting member and, once fixed, support the transfer guard mounting member at the desired operating position.

BRIEF DESCRIPTION OF THE DRAWINGS

FIG. 8 is a perspective view of the adjustable mount of FIG. 2 showing the secondary links oriented at different angles relative to the primary link;

FIG. 9 is a perspective view of a bolt of one of the connector assemblies of the adjustable mount of FIG. 2;

FIG. 10 is a perspective view of an adjustable mount having secondary links positioned at opposite ends of a primary link and a mounting member receiver positioned intermediate the secondary links along the primary link;

FIG. 11 is a perspective view of the adjustable mount of FIG. 10 with brackets and associated connector assemblies of the mount removed;

DETAILED DESCRIPTION

Figure 1:
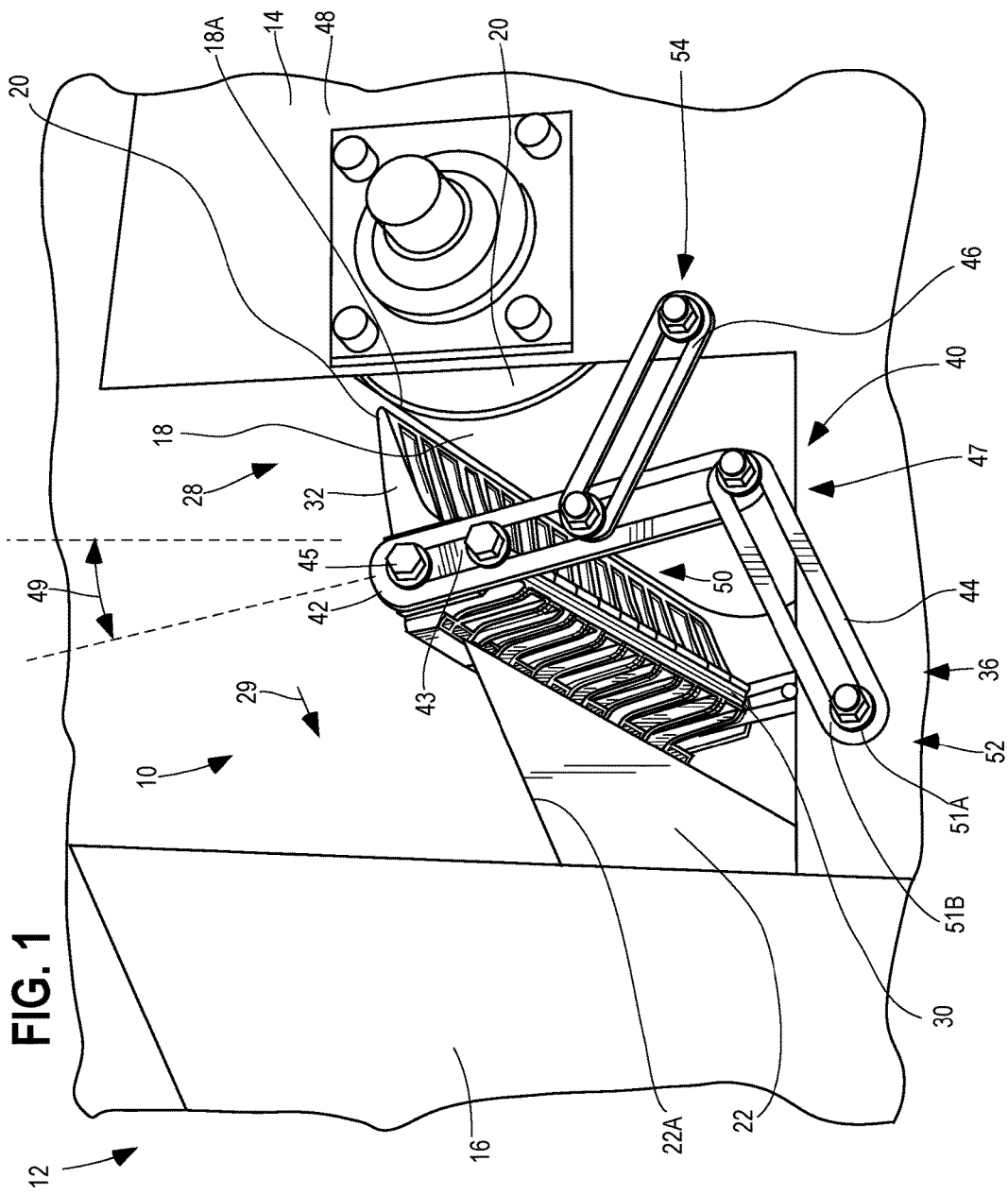
FIG. 1 is a perspective view of a transfer guard system for transferring objects between a conveyor belt and a chute of a conveyor.

In accordance with one aspect of the present disclosure, a transfer guard system is provided for transferring objects across a gap between conveying surfaces of a conveyor. The transfer guard system includes an elongate mounting member and at least one transfer guard member connected to the mounting member. Transfer guard members, and their mounting member, can take on a variety of configurations. To this end, transfer guard members, mounting members, and associated components disclosed in Applicant's U.S. Pat. No. 8,365,899 issued Feb. 5, 2013 and U.S. Pat. No. 9,663,306 issued May 30, 2017, which are incorporated as if reproduced in their entireties herein, can be used in the transfer guard system herein.

The transfer guard system includes at least one mount having a receiver that receives the mounting member. The at least one mount includes a plurality of link members and at least one pivot connection between the link members. The at least one pivot connection permits at least one of the link members to pivot and slide relative to the mounting member receiver so that the at least one link member can be mounted to a conveyor structure at a position best suited for the particular conveyor. For example, the at least one link member may pivot relative to the mounting member receiver throughout a sector of a circle. The at least one mount further includes at least one locking member operable to fix the link members relative to one another and secure the at least one mount relative to the conveyor. In this manner, the transfer guard system provides flexibility to install the mounting member receiver at a desired position in the gap, such as at a desired longitudinal position, vertical position, and angle relative to horizontal.

In one form, the at least one pivot connection is slidable between different positions along the link members and permits sliding movement of the link members relative to each other. This makes installation of the transfer guard system easier because the at least one link member may be pivoted throughout a sector of a circle at any position along the path of sliding movement permitted by the at least one pivot connection. In this manner, the at least one link member may be secured to a conveyor structure anywhere within a large area near the gap. This is especially advantageous where there is little or no structure extending along the gap that would conventionally be used to secure a mounting bracket thereto. The link members may be linear and the at least one pivot connection may be linearly slidable along the link members.

In one form, the link members include a primary link member and the at least one link member includes a pair of secondary link members. The at least one pivot connection includes a pair of pivot connections. One of the pivot connections pivotally connects one of the secondary link members to the primary link member and the other pivot connection pivotally connects the other secondary link member to the primary link member. The multiple pivot connections provide additional freedom of movement to tilt or raise the mounting member receiver in the gap relative to the conveying surface. The at least one locking member may include a locking member for each of the pivot connections that is operable to lock the associated pivot connection against movement for fixing the mounting member receiver at the predetermined position in the gap.

With reference to FIG. 1, a transfer guard system 10 is shown installed on a conveyor 12 including modular conveyor components such as conveyor modules 14, 16. The conveyor module 14 includes a conveyor belt 18 that extends around pulleys with a pulley 20 being shown. The conveyor module 16 includes a slide 22 that receives objects traveling in downstream longitudinal direction 29 from the conveyor belt 18. The conveyor 12 includes a laterally extending gap 28 between the conveying surfaces 18A, 22A of the conveyor belt 18 and the slide 22. The transfer guard system 10 includes one or more transfer guard members 32 for transferring objects across the gap 28. The transfer guard members 32 transfer objects from a first conveying surface portion, such as the surface 18A of the conveyor belt 18, to a second conveying surface portion, such as the surface 22A of the slide 22. In another embodiment, the transfer guard system 10 is installed to transfer objects across a hitch in a conveyor belt and the first conveying surface portion and the second conveying surface portions are surface portions of the same conveyor belt. The transfer guard system 10 includes an elongate mounting member 30 extending laterally in the gap 28 to either side thereof and the one or more transfer guard members 32 are detachably connected to the mounting member 30.

The transfer guard system 10 includes adjustable mounts 36 at opposite ends of the mounting member 30. Each adjustable mount 36 includes a plurality of support members that are movable between a plurality of angular orientations relative to each other and a plurality of positions relative to each other to permit the transfer guard system 10 to be readily installed in many different conveyor configurations. In one embodiment, each adjustable mount 36 includes a linkage 40 having a plurality of support members, such as a primary link 42 and secondary links 44, 46. The link members 42, 44, 46 may have a rigid, slotted configuration. The adjustable mount 36 includes a mounting member receiver, such as receiver 43, for being connected to the primary link 42 and receiving one end portion of the mounting member 30. The linkage 40 includes pivot and slide connections, such as connector assemblies 47, 50, 52, 54, that permit relative movement of the primary link 42 and secondary links 44, 46 during installation of the transfer guard system 10. This provides an installer greater flexibility to position the receiver 43 at a predetermined position in the gap 28, such as at a particular height and an angle 49 within the gap 28.

More specifically, the connector assemblies 47, 50 permit the primary link 42 to slide and pivot relative to the secondary links 44 and 46. The connector assemblies 52, 54 connect the secondary links 44, 46 to conveyor structure 48 of the modules 14, 16 and permit the secondary links 44, 46 to slide and pivot relative to the conveyor structure 48 during installation. The adjustable mounts 36 thereby have an installation configuration wherein an installer can slide one or more of the links 42, 44, 46 relative to another one of the links 42, 44, 46 and adjust the position at which the links 42, 44, 46 position the mounting member 30 relative to the surfaces 18A, 22A.

For example, the connector assembly 52 may connect the secondary link 44 to a frame or skirt wall of the conveyor module 16 and the connector assembly 54 may connect the secondary link 46 to a frame or skirt wall of the conveyor module 14. The frames of the conveyor modules 14, 16 may support the pulley 20 and slide 22 on opposite lateral sides of the upper run of the conveyor belt 18 and the slide 22. The skirt walls of the conveyor modules 14, 16 may extend along opposite lateral sides of the upper run of the conveyor belt 18 and the slide 22. The frame or skirt walls may have holes already formed therein that are used to receive fasteners of the connector assemblies 52, 54. Alternatively, holes may be formed in the frame or skirt walls to accommodate fasteners of the connector assemblies 52, 54.

Once the receiver 43 is in a desired location in the gap 28, the installer operates at least one locking member, such as tightening down nuts of the connector assemblies 47, 50, 52, 54, to fix the primary and secondary links 42, 44, 46 relative to each other and the conveyor structure 48 and secure the receiver 43 in the desired location in the gap 28. In this manner, the adjustable mounts 36 have an operating configuration wherein the links 42, 44, 46 rigidly support the mounting member 30 and transfer guard members 32 connected thereto at the desired position relative to the surfaces 18A, 22A. The positions and orientations of the links 42, 44, 46 may be different for each of the adjustable mounts 36 which permits the adjustable mounts 36 to be independently tailored to the conveyor structure on the respective side of the conveyor.

During installation of the transfer guard system 10, an installer may first connect the transfer guard members 32 to the mounting member 30. The mounts 36 are assembled with nuts 51A of the connector assemblies 47, 50, 52, 54 not fully tightened down so that the secondary links 44, 46 may pivot and slide relative to the primary link 42. Next, the ends of the mounting member 30 are advanced into openings of the receivers 43 (see e.g., FIG. 5) to loosely assemble the transfer guard system 10. The installer then lowers the loosely assembled transfer guard system 10 in the installation configuration thereof toward the gap to advance the mounting member 30 and transfer guard members 32 into the gap 28. The installer may permit the transfer guard members 32 to rest on the conveyor belt 18/pulley 20 and the slide 22. The transfer guard members 32 support the weight of the loosely assembled transfer guard system 10 as the installer performs the rest of the installation.

The installer may then slide the primary link 42 relative to the receiver 43 and slide and/or pivot the secondary links 44, 46 relative to the primary link 42 to align openings, such as slots, of the secondary links 44, 46 with the conveyor structure 48. The installer may mark a desired location for fasteners of the connector assemblies 52, 54, move the secondary links 44, 46 out of the way, and drill openings for the fasteners (if openings are not already present). The installer then assembles the connector assemblies 52, 54 to the conveyor structure 48, confirms the transfer guard members 32 are at the desired position in the gap 28, and tightens down the bolts 45 of the receiver 43 and the nuts 51A of the connector assemblies 47, 50. The adjustable mounts 36 are thereby fixed in the operating configuration thereof.

In an alternative approach, an installer may first connect the adjustable linkage mounts 36 to the conveyor structure 48 on opposite sides of the gap 28. The installer connects the transfer guard members 32 to the mounting member 30, inserts end portions of the mounting member 30 into the receivers 43 of the adjustable mounts 36, and connects the receivers 43 to the primary links 42 of the adjustable mounts 36. The installer may then loosen one or more of the nuts of the connector assemblies 47, 50, 52, 54 of each mount 36 to place the mount 36 in the installation configuration and adjust the relative position of the links 42, 44, 46 and the corresponding position of the mounting member 30 and transfer guard members 32 within the gap 28. Once the transfer guard members 32 are at the desired position in the gap 28, the installer tightens down the one or more nuts of the connector assemblies 47, 50, 52, 54 to fix the links 42, 44, 46 relative to each other and the conveyor structure 48. The links 42, 44, 46 and fixed connector assemblies 47, 50, 52, 54 are in the operating configuration thereof and rigidly support the mounting member 30 and transfer guard members 32 connected thereto in the gap 28.

In one form, each connector assembly 47, 50, 52, 54 includes a bolt, a lock washer, and a nut. In another form, each connector assembly 47, 50, 52, 54 includes a bolt and a flanged lock nut. The links 42, 44, 46 include the elongated slots through which the shanks of the bolts 51B of the connector assemblies 50, 52, 53, 54 extend. The bolt shanks can contact the sides of the slots of the links 42, 44, 46 to constrain the links 42, 44, 46 to sliding and pivotal movement relative to one another with the shanks acting as pivot shafts about which the links pivot. The nuts 51A may be threaded onto shank portions of the bolts 51B and tightened to cause the connector assemblies 47, 50, 52, 54 to clamp the links 42, 44, 46 together as well as clamp the links 44, 46 to the conveyor structure 48. This fixes the links 42, 44, 46 relative to each other and the conveyor structure 48. The lock washer or flanged lock nut of each of the connector assemblies 47, 50, 52, 54 resists loosening of the nuts and movement of the links 42, 44, 46. The receiver 43 may be connected to the primary link 42 using the bolts 45 before or after the links 42, 44, 46 have been fixed. In another form, the primary link 42 may incorporate the receiver 43 so that the primary link 42 has a unitary, one-piece construction with an opening sized to receive the end of the mounting member 30 thereon.

With the connector assemblies 47, 50, 52, 54 fixed in position, the linkage 40 supports the mounting member 30 against movement in the gap 28. The links 42, 44, 46 are arranged to support the mounting member 30 against loading from operation of the conveyor 12. For example, the conveyor belt 18 may include a splice that periodically impacts the transfer guard members 32 in the downstream longitudinal direction 29. Other sources of loading on the transfer guard system 10 include the friction between objects sliding along the transfer guard members 32 and the weight of objects on the system 10 such as in a chute or slide application. The connector assemblies 47, 50, 52, 54 tightly clamp the links 42, 44, 46 to each other and to the conveyor structure 48 to frictionally resist movement of the links 42, 44, 46. In this manner, the transfer guard members 32 are rigidly held in position to transfer objects across the gap 28.

Figure 2:
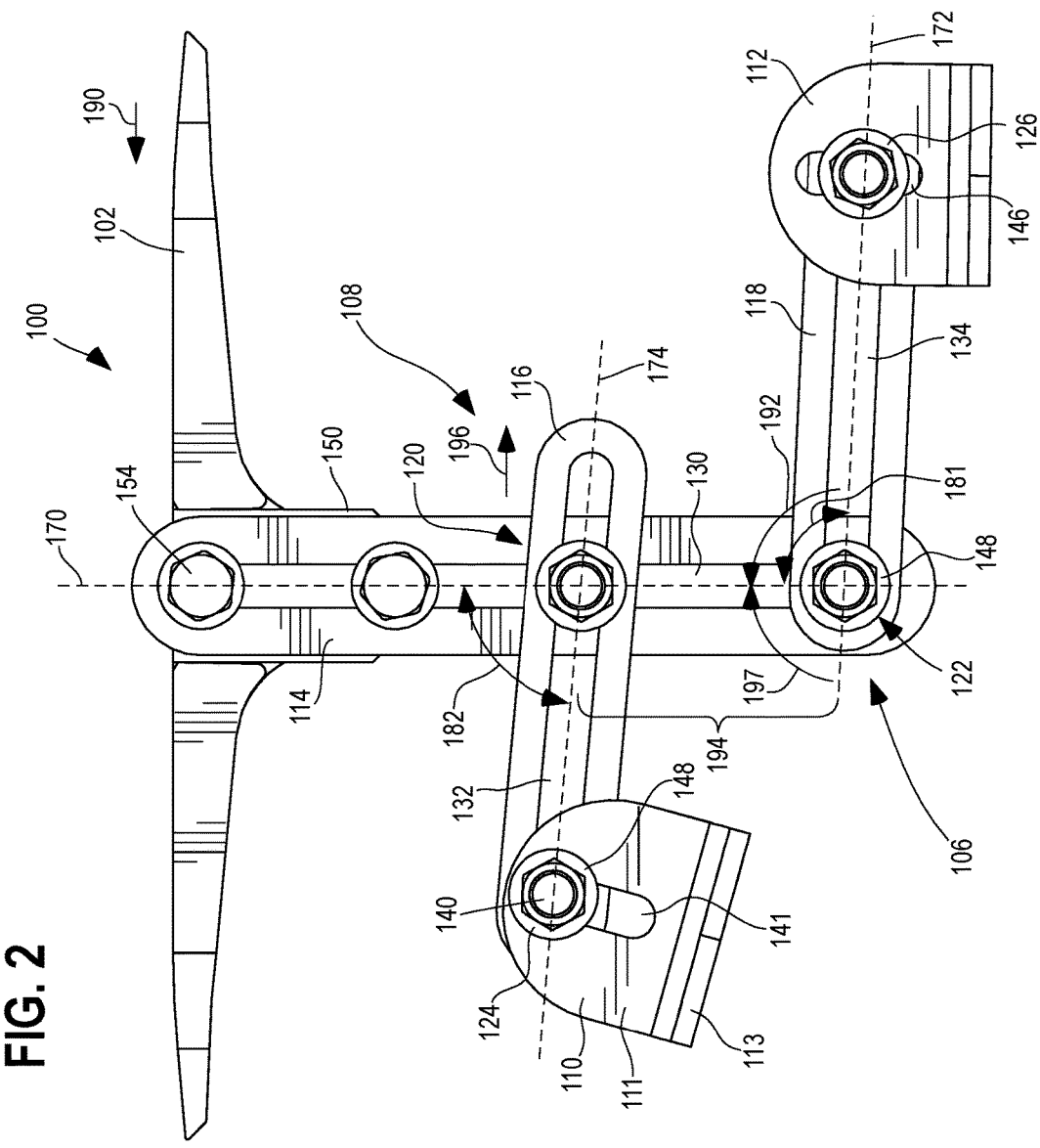
FIG. 2 is a side elevational view of a transfer guard system having an adjustable mount including a primary link and a pair of secondary links.
Figure 3:
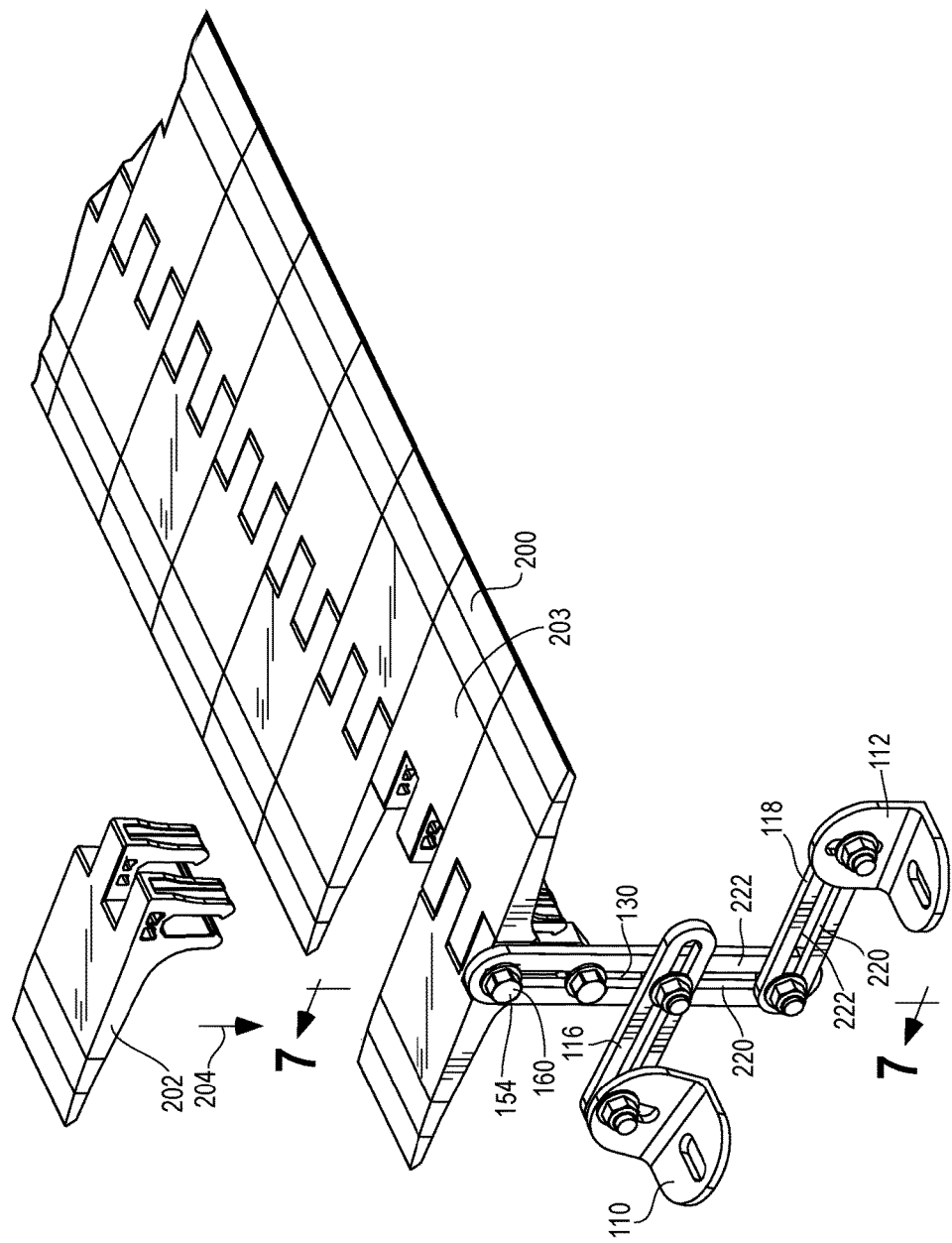
FIG. 3 is a perspective view of the transfer guard system of FIG. 2 showing a transfer guard member of the system disconnected from a mounting member of the system.

With reference to FIGS. 2 and 3, a transfer guard system 100 is provided that is similar in many respects to the transfer guard system 10 discussed above. The transfer guard system 100 includes one or more transfer guard members 102 connected to a mounting member 104 (see FIG. 5). The transfer guard system 100 includes a pair of adjustable mounts 106 at opposite ends of the mounting member 104 for supporting the mounting member 104 in a gap between conveying surfaces. Each adjustable mount 106 includes a linkage 108 and brackets 110, 112 for securing the linkage 108 to a conveyor structure. The linkage 108 includes a primary link 114 and secondary links 116, 118. The linkage 108 also includes connector assemblies 120, 122, 124, 126 for fixing the links 114, 116, 118 in a desired orientation relative to one another.

In one form, the links 114, 116, 118 include elongated slots 130, 132, 134 and the connector assemblies 120, 122, 124, 126 each include a bolt 140 extending through pairs of the slots 130, 132, 134 and slots 141, 146 of the brackets 110, 112. The connector assemblies 120, 122, 124, 126 also include nuts 148 in threaded engagement with the bolts 140 that may be loosened to permit relative movement between the links 114, 116, 118 and brackets 110, 112 and tightened to fix the relative positions of the links 114, 116, 118 relative to the brackets 110, 112. The brackets 110, 112 include upright mounting portions 111 that define the slots 141, 146 and base portions 113 that are secured, such as by a fastener or weld, to a conveyor structure. As shown, the base portion 113 and upright mounting portion 111 are perpendicular to one another as an example.

Figure 5:
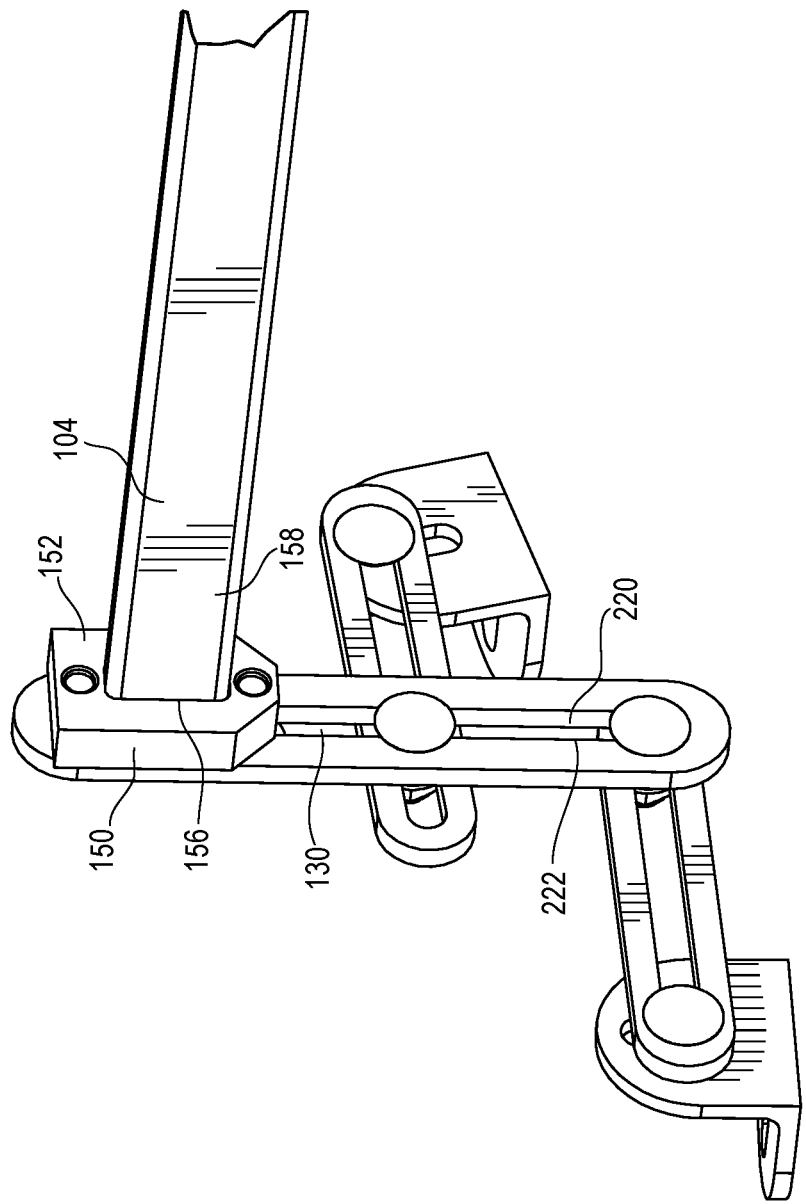
FIG. 5 is a perspective view of a portion of the transfer guard system of FIG. 2 with the transfer guard members removed to show the mounting member received in a receiver of the adjustable mount.

The adjustable linkage mount 106 includes a receiver 150 that is secured to the primary link 114 for supporting the mounting member 104. In one form, the receiver 150 includes a body 152 and fasteners, such as bolts 154, which engage threaded bores 156 of the body 152. With reference to FIGS. 3 and 5, the receiver body 152 includes an opening 156 that is sized to snugly receive an end portion 158 of the mounting member 104 thereon. The bolts 154 include enlarged head portions 160 that, when tightened down, clamp the primary link 114 between the bolt head portion 160 and the receiver body 152. Further, the bolts 154 include threaded shanks 162 sized to extend through the slot 130 and engage the threaded bores 156 of the body 152. When the bolts 154 are loosened, the receiver 150 may be slid along the primary link 114 to a desired position therealong. As shown, the link 114 has a linear configuration as does the slot 130 thereof so that the receiver 150 undergoes linear sliding for being adjusted in the linear slot 130.

The slide connection between the receiver 150 and the primary link 114 provides additional flexibility in positioning the receiver 150 in the gap between conveying surfaces. As an example, an installer may want to position the receiver 150 of the transfer guard system 100 within a gap so that upper surfaces 203 (see FIG. 4) of the transfer guard members 102 are slightly below the top of pulleys of two conveyor belts on opposite sides of a gap therebetween. The installer manipulates the links 114, 116, 118 of the mounts 106 to position the receivers 150 at roughly the desired position. Next, the connector assemblies 120, 122, 124, 126 may be fixed and the mounting member 102 with the transfer guard members 102 mounted thereto connected to the receivers 150. The installer may then perform a fine adjustment of the position of the transfer guard members 102 by sliding the receivers 150 along the primary links 114. The installer may perform a final tightening of the bolts 154 to fix the mounting member 104 in the desired position.

With reference to FIG. 2, the links 114, 116, 118 may have longitudinal axes 170, 172, 174. The links 114, 116, 118 may be positioned so that the axes 170, 172 extend transversely and have an angle 181 therebetween and the axes 170 and 174 have an angle 182 therebetween. The angles 181, 182 may each be acute, right, or obtuse as some examples. The angles 181, 182 and the relative positioning of the links 114, 116, 118 may be adjusted by sliding the bolts 140 along the slots 130, 132, 134 and turning the links 114, 116, 118 relative to each other to obtain the desired orientation of the linkage 108. The installer then tightens down the nuts 148 to fix the linkage 108 in the desired orientation.

In one approach, the impacts from a splice of a conveyor belt include a force component that acts generally in direction 190 against the transfer guard members 102. This applies a force against the primary link 114 and a corresponding torque in direction 192 about the connector assembly 122. To counteract this torque, the installer spaces the connector assembly 120 from the connector assembly 122 along the primary link 114 by distance 194 and orients the secondary link 116 to extend generally perpendicular to the primary link 114. With the bracket 110 secured to a conveyor structure, the second link 116 provides a reactionary force in direction 196 against the primary link 114 and a corresponding torque in direction 197 to counteract the torque applied in direction 192. The force component of the impact of the conveyor belt splice in direction 190 also imparts a torque about the connector assembly 120. The secondary link 118 provides a reactionary force against the primary link 114 the distance 194 from the connector assembly 120 and a corresponding torque about the connector assembly 120 to counteract the torque from the conveyor splice. The secondary links 116, 118 thereby counteract the torque imparted on the connector assemblies 120, 122 due to the impact of the conveyor belt splice against the transfer guard members 102.

In one approach, the links 116, 118 are connected to the primary link 114 as far apart as practical and generally parallel to the plane of product travel to counteract torque applied to the primary link 114 during conveyor operation. Because the installer has flexibility in the orientation of the links 112, 114, 116, the installer can select an orientation that balances torque applied to the primary link 114 to maximize the resistance against loosening of the connector assemblies 120, 122, 124, 126. Further, when properly tightened down, the connector assemblies 120, 122, 124, 126 provide a significant clamping force that can counteract torque produced during conveyor belt operations.

The transfer guard system 100 may be installed so that the transfer guard members 102 each contact a conveying surface, such as the upper run of a conveyor belt traveling around a pulley. The transfer guard members 102 can transfer loading directly to the conveying surface and pulley such as from an object traveling across the transfer guard members 102. In this manner, the loading is transmitted directly from the transfer guard member 102 to the conveying surface rather than the linkage 40 having to absorb all of the loading by itself.

The components of the mount 106 are made from materials sufficient to withstand loading during conveyor operations. For example, the links 112, 114, 116 may be made of ¼ inch thick hot rolled steel. It will be appreciated that different thicknesses and materials may be used for different applications.

Figure 4:
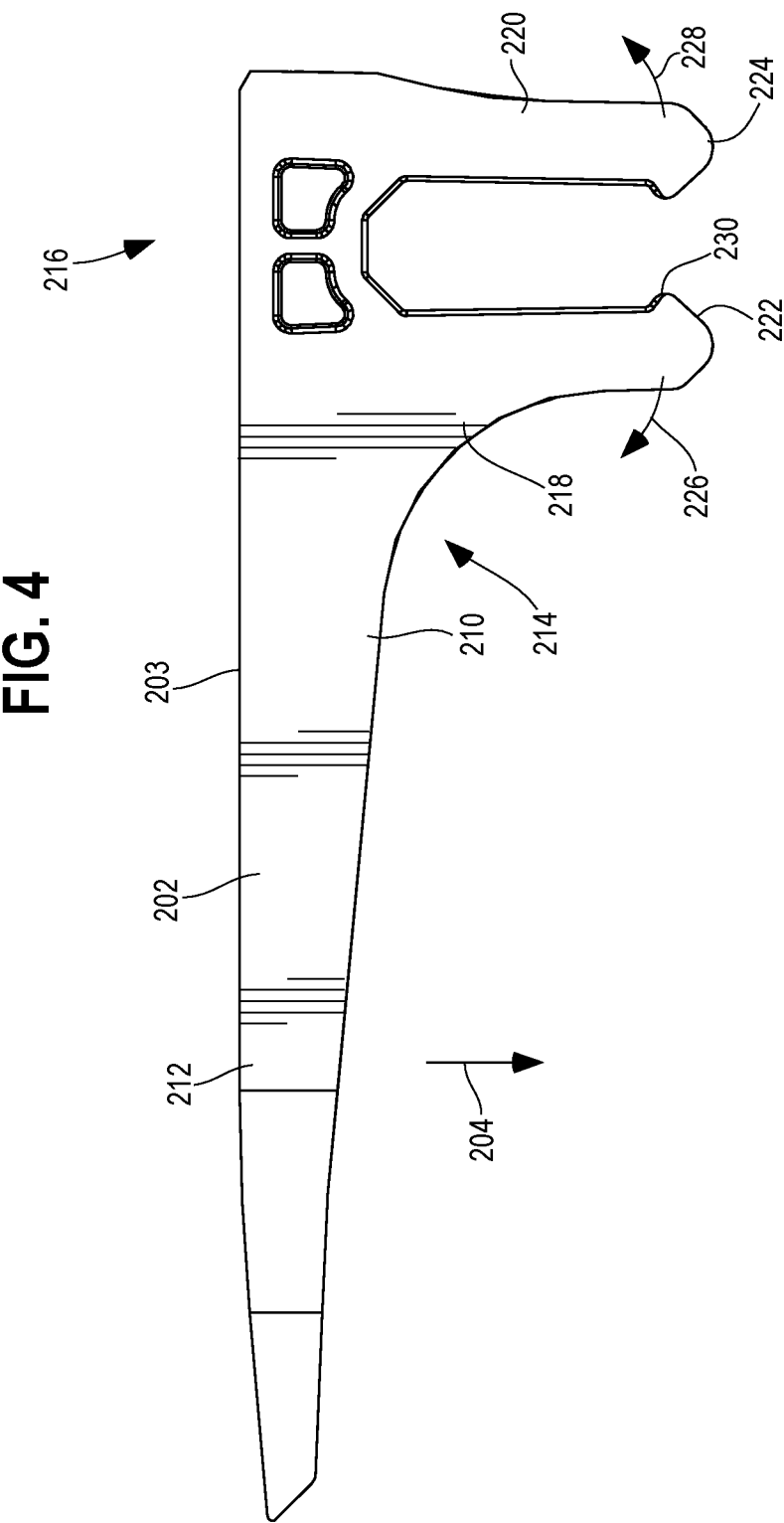
FIG. 4 is a side elevational view of the transfer guard member of FIG. 3 showing a pair of resilient legs of the transfer guard member.

With reference to FIGS. 3 and 4, the transfer guard members 102 include upstream transfer guard members 200 and downstream transfer members 202. In FIG. 3, one of the downstream transfer guard members 202 has been disconnected and removed from the mounting member 104. The transfer guard member 202 may be reconnected to the mounting member 104 by advancing the transfer guard member 202 in direction 204. As discussed below, the transfer guard member 202 forms a detachable connection directly with the mounting member 104. The transfer guard members 102 may detach from the mounting member 104 in response to significant impacts against the transfer guard members 102.

With reference to FIG. 4, the transfer guard member 202 includes a body 210 having an outboard portion 212 and an attachment portion 214. The attachment portion 214 includes a bridge portion 216 and resilient leg portions 218, 220 depending from the bridge portion 216. The leg portions 218, 220 include cam surfaces 222 that engage the mounting member 104 as the transfer guard member 202 is advanced downward in direction 204 onto the mounting member 104. The camming engagement between the cam surfaces 222 and the mounting member 104 shifts the lower ends 224 of the leg portions 218, 220 apart in directions 226, 228. Once the transfer guard member 202 seats on the mounting member 104, the leg portions 218, 220 include protrusions 230 that engage an underside of the mounting member 104 and detachably fix the transfer guard member 202 to the mounting member 104. In one approach, the transfer guard members 102 each have a unitary, one-piece construction and may be formed from a plastic material, such as high-density polyethylene.

Figure 6:
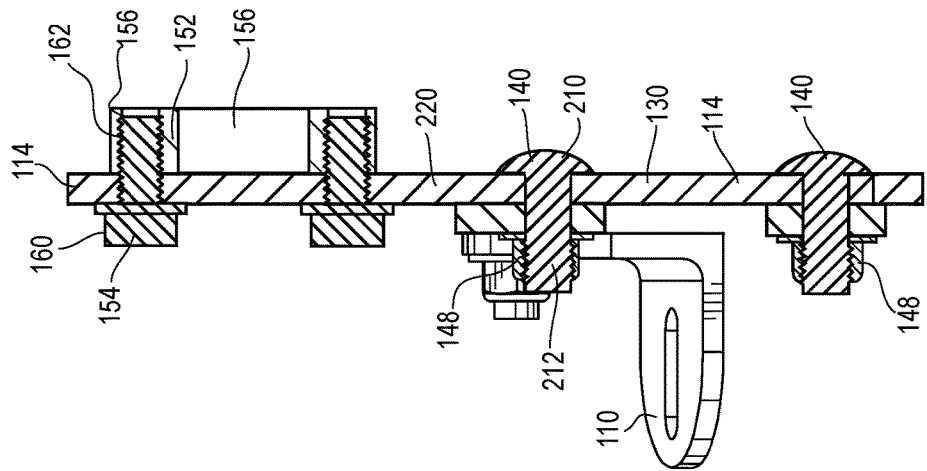
FIG. 6 is a front elevational view of the adjustable mount of FIG. 5 showing brackets of the adjustable mount on one side of the primary and secondary links.

With reference to FIG. 6, the adjustable mount 106 has a compact profile in the lateral direction and may have the brackets 110, 112 and secondary links 116, 118 on a common side of the primary link 114. As shown in FIG. 6, the brackets 110, 112 and links 116, 118 are positioned laterally outward relative to the primary link 114 so that brackets 110, 112 may be secured to conveyor structures laterally outward away from the conveying surfaces. The adjustable mount 106 may be reconfigured so that the brackets 110, 112 and secondary links 116, 118 are positioned laterally inward relative to the primary link 114 so that the brackets 110, 112 may be secured to a conveyor structure laterally inward toward the conveying surfaces. Still further, the base portions 113 of the mounts 110, 112 are oriented to extend laterally outward (to the left in FIG. 6). The mounts 110, 112 may be flipped so that the base portions 113 of the mounts 110, 112 are oriented to extend laterally inwardly (to the right in FIG. 6). This may further reduce the profile of the mount 106 in the lateral direction.

Figure 7:
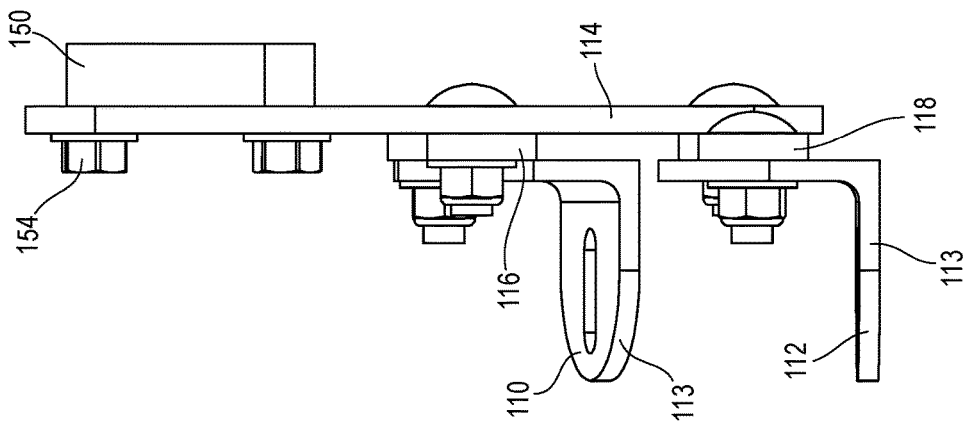
FIG. 7 is a cross-sectional view taken across line 7-7 in FIG. 3 showing connector assemblies of the mount holding the primary and secondary links together.

With reference to FIGS. 7 and 9, the bolts 140 may each include a head portion 210 that is enlarged relative to a shank portion 212. The shank portion 212 may be threaded to engage one of the nuts 148. The bolts 140 may also include a square neck portion 214 having flats 216 that abut opposed surfaces 220, 222 (see FIG. 5) of the link slots 130, 132, 134. The engagement between the flats 216 of the bolt neck portion 214 and the slot surfaces 220, 222 restricts turning of the bolts 140 relative to the links 114, 116, 118. This increases resistance of the connector assemblies 120, 122, 124, 126 to loosening during conveyor operation. Further, the connector assemblies 120, 122, 124, 126 may include lock washers to resist loosening of the nuts 148 relative to the bolts 140.

The linkage 108 may include additional features to resist loosening. For example, the links 114, 116, 118 may have grit surface treatment to resist turning of the nuts 148 and/or lock washers relative to the links 114, 116, 118. As another example, the connector assemblies 120, 122, 124, 126 may include grit coated washers and/or bidirectional lock washers. In another form, the primary link 114 may have two elongated slots 130 and the connector assemblies 120, 122 may each include two bolts 140 extending through the two slots 130 of the primary link 114. As another example, the links 114, 116, 118 may be tack welded after assembly to fix the linkage 108 in position.

The linkage 108 may also be configured to permit a flush mounting of one or more of the links 114, 116, 118 relative to a conveyor structure. For example, one or more of the slots 130, 132, 134 may be counterbored. The bolts 140 may be hex bolts with head flats engaging the counter bore walls of the slots 130, 132, 134. The head flats may be used instead of the neck flats 216 to limit turning of the bolts 140 relative to the associated link 114, 116, 118.

With reference to FIG. 8, the secondary links 116, 118 are shown in a different orientation than shown in FIG. 2. Specifically, the secondary links 116, 118 have been turned so that there is an angle 250 between the axes 170, 174 that is larger than the angle 182 of FIG. 2. Similarly, the secondary link 118 has been turned relative to the primary link 114 so that an angle 252 between the axes 170, 172 is larger than the angle 181 of FIG. 2. This reconfiguration of the adjustable mount 106 may be quickly and easily achieved by loosening the nuts 148 of the connector assemblies 120 and 122, adjusting the secondary links 116, 118 relative to the primary link 114, and then re-tightening the nuts 148 of the connector assemblies 120, 122. In this manner, the mount 106 may be reconfigured, for example, to quickly and easily fit a new configuration of conveyor modules.

Further, the brackets 110, 112 in FIG. 8 have been turned relative to the secondary links 116, 118 so that there are angles 254, 256 between the axes 172, 174 and axes aligned with the slots 141, 146 of the brackets 110, 112. Angles 254, 256 may be larger than the corresponding angles in the configuration of FIG. 2.

With reference to FIG. 10, an adjustable mount 300 is provided that is similar in many respects to the adjustable mount 106 and may be used in place of the adjustable mount 106. The adjustable mount 300 includes a primary link 302, secondary links 304, 306, and brackets 308. The adjustable mount 300 includes connector assemblies 310, 312, 314, 316 for securing the links 302, 304, 306 relative to one another. The primary link 302 includes opposite end portions 320, 322 and an elongated slot 324. The secondary links 304, 306 are connected to the primary link 302 at the end portions 320, 322. The adjustable mount 300 includes a receiver 330 having bolts 332 for extending through the slot 324 and securing the receiver 330 at an intermediate portion 319 of the primary link 302.

Because the secondary links 304, 306 are secured at the end portions 320, 322 of the primary link 302, the secondary links 304, 306 may provide reactionary forces that balance out torque imparted to the primary link 320 by impacts during conveyor operation. For example, a conveyor belt splice may impact transfer guard members connected to the mounting member supported by the receiver 330. The splice impact may include a force component that acts against the primary link 302 in a direction 331 with the point of force application being spaced by a distance 333 from the connector assembly 312, which imparts a torque in direction 335 about the connector assembly 312.

The secondary link 304 is joined to the primary link 302 by the connector assembly 310 a distance 339 from the receiver 330. The secondary link 304 is spaced from the connector assembly 317 by a distance that is the sum of distances 339, 333. When the splice imparts a force component against the primary link 302 in direction 331, the secondary link 304 provides a reactionary force to the primary link 302 in direction 337 and imparts a torque in direction 341 and balances out the torque in direction 335.

Similarly, the force component acting in direction 331 from the conveyor belt splice impact creates a torque about the connector assembly 310. The secondary link 306 applies a reactionary force in direction 337 and provides a torque about the connector assembly 310 that balances out the torque caused by the splice impact. In other words, the secondary links 304, 306 share reaction forces that counteract forces caused by the splice impact. This balancing of torque resists movement of the primary link 302 relative to the secondary links 304, 306 and loosening of the connector assemblies 310, 312.

With reference to FIG. 11, the adjustable mount 300 may be installed without the brackets 308, 310. The secondary links 304, 306 include elongated slots 340, 342 and fasteners may be used to extend through the slots 340, 342 and secure the secondary links 304, 306 to a conveyor structure.

Figure 13:
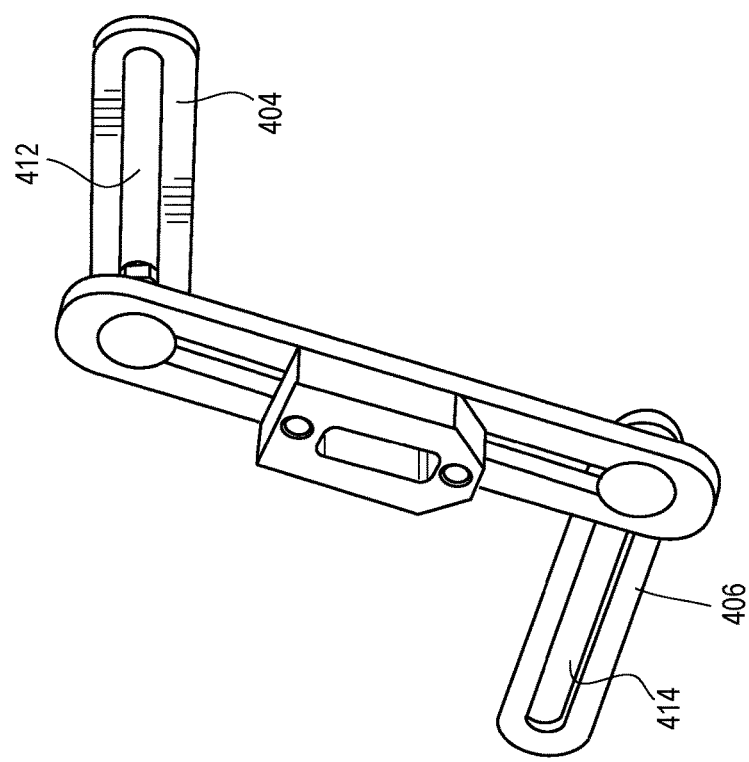
FIG. 13 is a perspective view of the adjustable mount of FIG. 12 with the brackets and associated connector assemblies removed.
Figure 12:
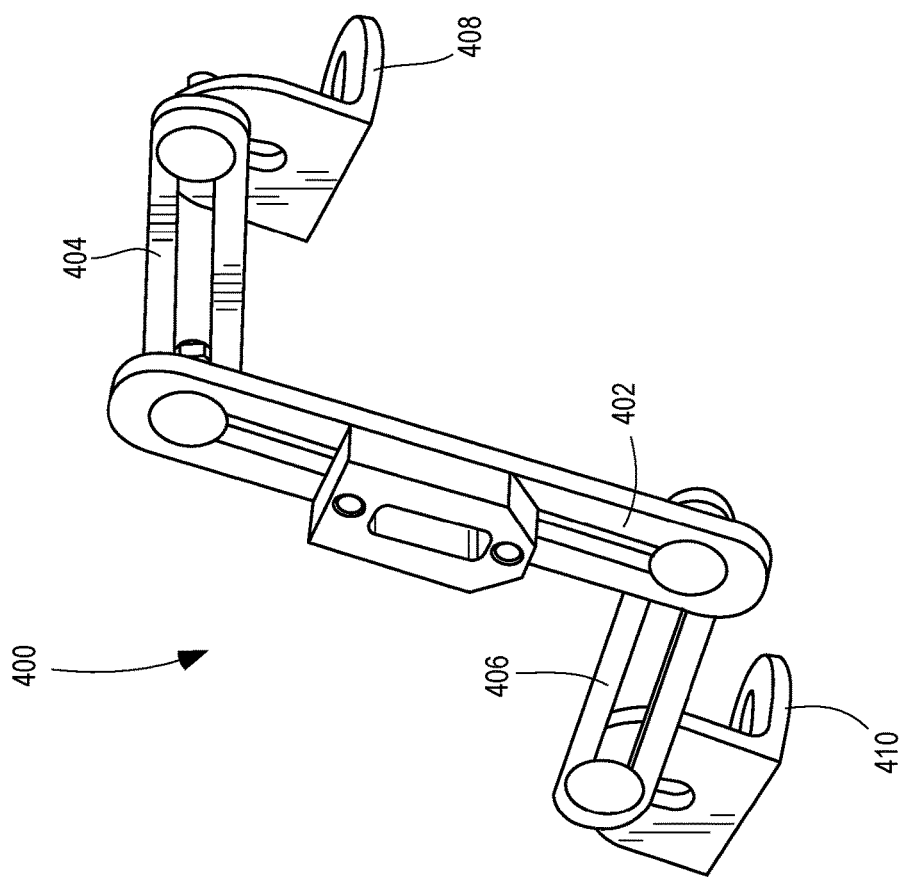
FIG. 12 is a perspective view of an adjustable mount having a primary link and secondary links connected to opposite ends of the primary link.

With reference to FIG. 12, an adjustable mount 400 is provided that is similar in many respects to the adjustable mount 300 discussed above. The adjustable mount 400 includes a primary link 402, secondary links 404, 406, and brackets 408, 410. The adjustable mount 400 has the secondary links 404, 406 extending in opposite directions from the primary link 402. By contrast, the secondary links 304, 306 of the adjustable mount 300 extend generally in the same direction from the primary link 302 (toward the right of the page in FIG. 10). With reference to FIG. 13, the adjustable mount 400 may be utilized without the brackets 408, 410. In this form, the secondary links 404, 406 include slots 412, 414 for receiving fasteners for securing the secondary links 404, 406 to a conveyor structure.

Figure 14:
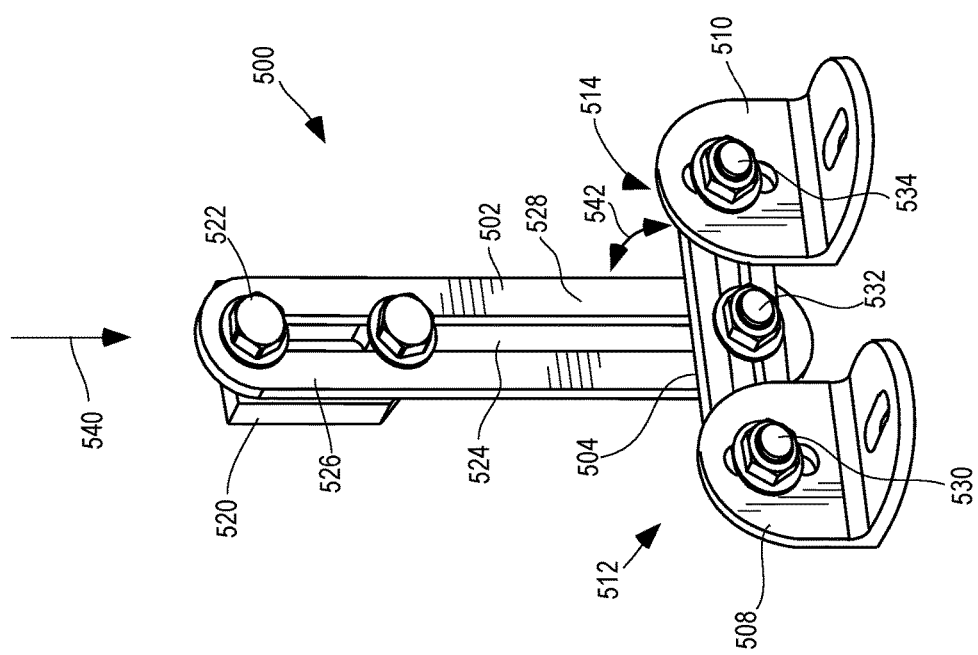
FIG. 14 is a perspective view of an adjustable mount having a primary link and a single secondary link.

With reference to FIG. 14, an adjustable mount 500 is provided that includes a primary link 502 and a single secondary link 504. The adjustable mount 500 may include brackets 508, 510 connected to end portions 512, 514 of the secondary link 504. The adjustable mount 500 includes a receiver 520 having bolts 522 that extend through an elongated slot 524 of the primary link 502 to secure the receiver 520 at an end portion 526 of the primary link 502. The primary link 502 has an opposite end portion 528 at which the primary link 502 is connected to the secondary link 504, although as apparent the secondary link 504 can be connected to the primary link 502 at positions spaced from the end portion 528 thereof. The adjustable mount 500 includes connector assemblies 530, 532, 534 for fixing the primary link 502 and the secondary link 504 in position relative to one another. The adjustable mount 500 may be desirable in applications where a significant portion of loading from conveyor operations acts in direction 540 along the length of the primary link 502. The primary link 502 may be pivoted to adjust an angle 542 and best position the primary link 502 to absorb the forces in direction 540. Further, the mount 500 may be installed so that the transfer guard members supported by the mount 500 contact one or both of the conveying surfaces so that the transfer guard members may transfer loading directly against the conveying surfaces. Having the transfer guard members contact the conveying surfaces to absorb loading improves the durability of the mount 500.

Figure 15:
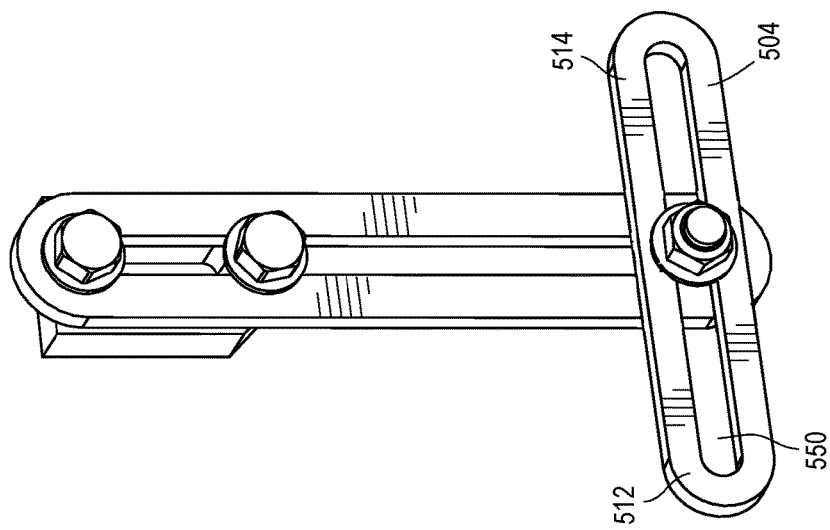
FIG. 15 is a perspective view of the adjustable mount of FIG. 14 showing the brackets and associated connector assemblies removed.

With reference to FIG. 15, the adjustable mount 500 may be utilized without the brackets 508, 510. In this form, the secondary link 504 has a slot 550 that may receive fasteners at the end portions 512, 514 for securing the secondary link 504 to a conveyor structure.

Figure 16:
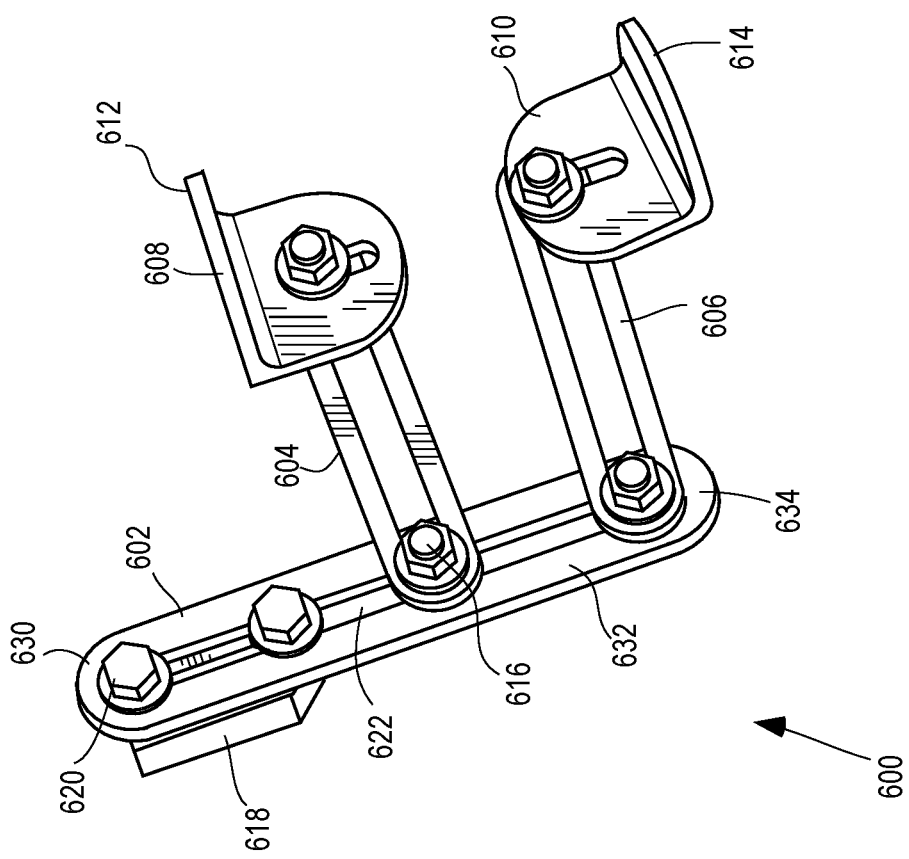
FIG. 16 is a perspective view of an adjustable mount having brackets on a common side of a primary link of the mount.

With reference to FIG. 16, an adjustable mount 600 is provided that includes a primary link 602, secondary links 604, 606, and brackets 608, 610. The adjustable mount 600 is similar in many respects to the adjustable mount 106 discussed above. One difference is that the secondary links 604, 606 are both oriented on the same side of the primary link 602 so that these can generally extend in a common direction on one side of the primary link 602. By contrast, the secondary links 116, 118 are oriented to extend away from the primary link 114 generally in opposite directions so that the secondary links 116, 118 are generally on opposite sides of the primary link 114 as shown in FIG. 2. Further, the brackets 608, 610 include base portions 612, 614 that are positioned above one another. The adjustable mount 600 includes connector assemblies 616 for locking the components of the adjustable mount 600 in position. Further, the adjustable mount 600 includes a receiver 618 with bolts 620 for extending through a slot 622 of the primary link 602. In this manner, the receiver 618 is at or near one end portion 630 of the primary link 602, the secondary link 604 is at an intermediate portion 632 of the primary link 602, and the secondary link 606 is at or near an end portion 634 of the primary link 602.

Figure 17:
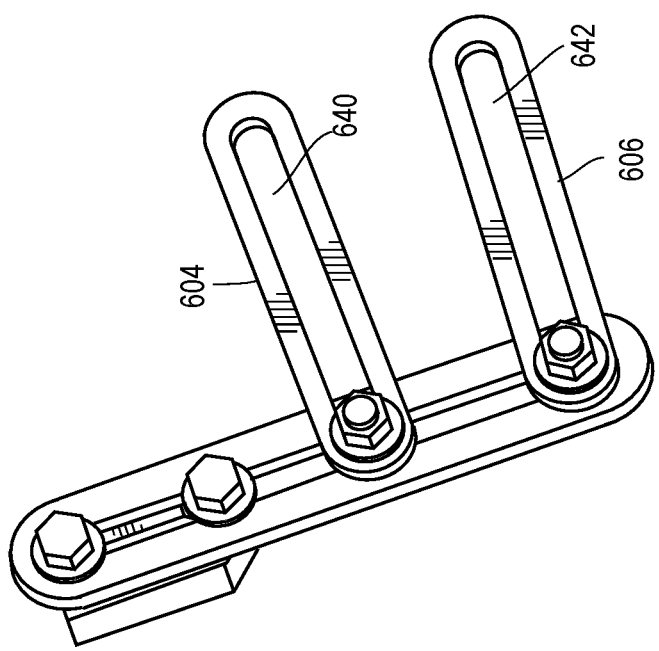
FIG. 17 is a perspective view of the adjustable mount of FIG. 16 with the brackets and associated connector assemblies removed.

With reference to FIG. 17, the adjustable mount 600 may be utilized without the brackets 608, 610. The secondary links 604, 606 include elongated slots 640, 642 for receiving a fastener or another member to secure the secondary links 604, 606 to a conveyor structure.

The adjustable mounts 36, 106, 300, 400, 500, and 600 have many components in common. In one form, the adjustable mount for a transfer guard system is provided as a kit containing the components of the adjustable mount 106. The installer may select one of the configurations of the adjustable mounts 36, 106, 300, 400, 500, and 600 and assemble the components to build the desired adjustable mount. This provides the installer the ability to narrowly tailor the adjustable mount to the structure of a particular conveyor.

Those skilled in the art will recognize that a wide variety of modifications, alterations, and combinations can be made with respect to the above-described embodiments without departing from the spirit and scope of the invention, and that such modifications, alterations, and combinations are to be viewed as being within the scope of the claims. For example, although the primary and secondary links are each shown having a single elongated slot, each link may have two or more openings for receiving a fastener or other member at spaced locations along the link.

What is claimed is:

1. A transfer guard system comprising:
an elongated mounting member for extending laterally across a gap between conveying surface portions;
at least one transfer guard member configured to be connected to the mounting member to transfer objects across the gap in a downstream longitudinal direction;
a pair of adjustable mounts configured to connect the mounting member to conveyor structure, the adjustable mounts having an installation configuration that permits adjustment of an operating position of the mounting member to a plurality of different operating positions and an operating configuration that secures the mounting member in the selected position; and
support members of each of the adjustable mounts configured to be movable between a plurality of angular orientations relative to each other and a plurality of positions relative to each other with the adjustable mount in the installation configuration and configured to be fixed relative to each other with the adjustable mount in the operating configuration.

2. The transfer guard system of claim 1 wherein the support members have an elongate configuration along a longitudinal axis thereof and the angular orientation is between the longitudinal axes of the support members.

3. The transfer guard system of claim 1 wherein the elongated member has a longitudinal axis and the adjustable mounts in the installation configuration thereof permit linear adjustment of the position of the mounting member in directions perpendicular to the longitudinal axis and rotary adjustment of the mounting member about an axis parallel to the longitudinal axis of the elongated member.

4. The transfer guard system of claim 1 wherein the adjustable mounts each include at least one connector assembly connecting the support members and having an unlocked configuration that permits relative movement between the support members and a locked configuration that fixes the support members relative to each other.

5. The transfer guard system of claim 1 wherein the support members each include an elongated slot and the mounts each include at least one fastener sized to extend through the elongated slots of two of the support members and slidably connect the support members.

6. The transfer guard system of claim 1 wherein the adjustable mounts each include at least one locking member rotatable to reconfigure the adjustable mount between the installation configuration and the operating configuration.

7. The transfer guard system of claim 1 wherein the support members are pivotally and slidably connected to each other.

8. The transfer guard system of claim 7 wherein the support members of each adjustable mount includes three support members pivotally and slidably connected to each other.

9. The transfer guard system of claim 1 wherein the at least one transfer guard member includes a plurality of transfer guard members configured to be directly connected to the mounting member.

10. The transfer guard system of claim 1 wherein each adjustable mount includes a receiver connecting the mounting member to one of the support members.

11. A conveyor system comprising:
a pair of conveying surface portions for conveying objects in a downstream longitudinal direction;
a gap extending laterally between the conveying surface portions;
at least one transfer member having a surface configured to transfer objects across the gap;
a mounting member extending laterally and connected to the at least one transfer member to support the at least one transfer member;
a pair of adjustable mounts connecting the mounting member to conveyor structure, each adjustable mount including:
a plurality of links for supporting the mounting member; and
at least one connector assembly configured to connect the links, the at least one connector assembly having an unlocked configuration that permits the links to pivot relative to each other and a locked configuration that fixes the links relative to each other.

12. The conveyor system of claim 11 wherein the at least one connector assembly provides a slide connection between the links that permits the links to shift relative to each other with the connector assembly in the unlocked configuration thereof.

13. The conveyor system of claim 11 wherein the plurality of links includes three links and the at least one connector assembly includes two connector assemblies that each permit two of the links to pivot relative to each other with the connector assembly in the unlocked configuration and fixes the two links relative to each other with the connector assembly in the locked configuration.

14. The conveyor system of claim 11 wherein the links include openings and the at least one connector assembly includes a bolt having a shank sized to extend through the opening of one link and the opening of another link to connect the links.

15. The conveyor system of claim 14 wherein the opening of the one link is elongated and the at least one connector assembly includes another connector assembly having a bolt sized to extend through the elongate opening of the one link and connect the one link to a conveyor structure.

16. The conveyor system of claim 11 further comprising a mounting member receiver configured to be connected to one of the links at a plurality of positions relative to the link.

17. The conveyor system of claim 16 wherein the one link includes a slot and the receiver includes at least one fastener sized to extend through the slot and form a slide connection between the receiver and the one link.

18. The conveyor system of claim 16 wherein the mounting member is elongated and has a non-circular cross section perpendicular to the length thereof and the mounting member receiver has a non-circular opening for receiving the mounting member.

19. The conveyor system of claim 11 wherein the links include openings and the at least one connector assembly includes a bolt having a head and a shank and a locking member configured to engage the shank and clamp the links between the bolt head and the locking member.

20. A method of installing a transfer guard system for transferring objects across a gap between conveying surface portions, the transfer guard system including a pair of mounts on either side of the conveying surface portions, the method comprising:

adjusting the relative position of links of linkages of the mounts of the transfer guard system; and fixing the linkages of the mounts to support a transfer guard mounting member of the transfer guard system at a desired position relative to the gap for transferring objects thereacross from one conveyor surface portion to another conveyor surface portion.

21. The method of claim 20 wherein adjusting the relative position of the links includes pivoting one of the links of each of the linkages relative to another one of the links of the linkage.

22. The method of claim 20 wherein the transfer guard system transfers objects across the gap in a downstream longitudinal direction and adjusting the relative position of the links includes shifting one of the links of one of the linkages in a longitudinal direction.

23. The method of claim 20 wherein adjusting the relative position of the links includes sliding a fastener of a connector assembly of each of the mounts along a slot of one of the links of the mount.

24. The method of claim 20 wherein each linkage includes a first link, a second link, and a third link and adjusting the relative position of the links includes adjusting the position of the first link relative to the second link and adjusting the position of the second link relative to the third link.

25. The method of claim 20 further comprising connecting the transfer guard mounting member to a receiver of each of the mounts and connecting the receiver to one of the links of the mount.

26. The method of claim 20 further comprising connecting the mounts to conveyor structure after fixing the linkages of the mounts.

27. The method of claim 20 further comprising releasably connecting directly a plurality of transfer guard members to the transfer guard mounting member.

* * * * *